Jan. 16, 1951  H. G. GREGORY  2,538,643
LEAF GATHERING AND DISPOSAL MACHINE
Filed June 6, 1946  3 Sheets-Sheet 1
Fig. 1.
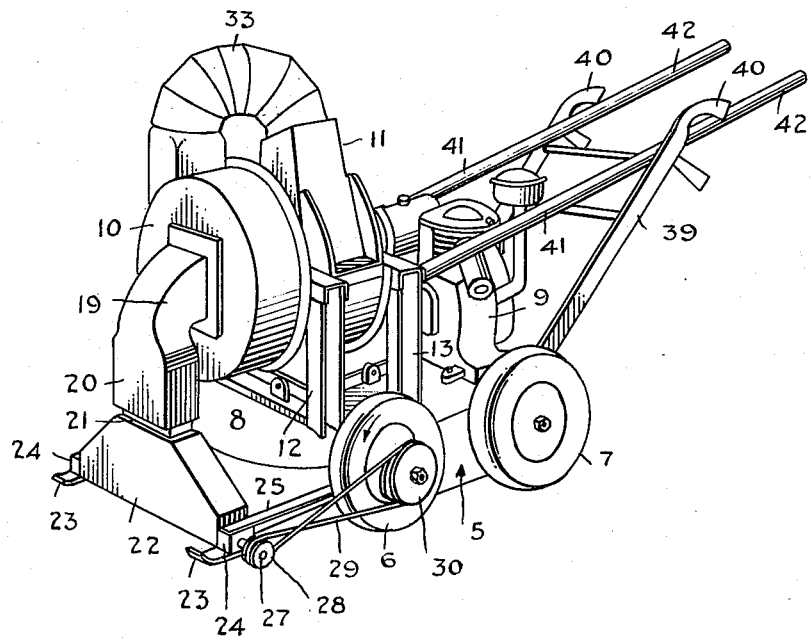
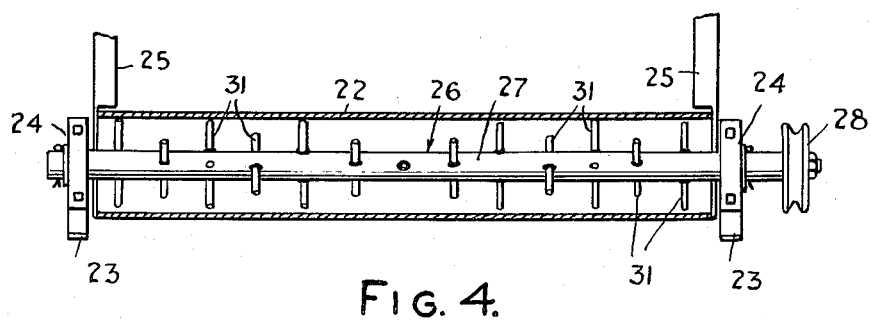
Fig. 4.
INVENTOR:
Horace G. Gregory,
By A. M. Freeman
ATTORNEY.

Jan. 16, 1951     H. G. GREGORY     2,538,643
LEAF GATHERING AND DISPOSAL MACHINE
Filed June 6, 1946     3 Sheets-Sheet 2

INVENTOR:
Horace G. Gregory,
A. W. Freeman
ATTORNEY.

Jan. 16, 1951 H. G. GREGORY 2,538,643
LEAF GATHERING AND DISPOSAL MACHINE
Filed June 6, 1946 3 Sheets-Sheet 3

INVENTOR.
HORACE G. GREGORY
BY
J. H. Braddock
ATTORNEY

Patented Jan. 16, 1951

2,538,643

UNITED STATES PATENT OFFICE 2,538,643

LEAF GATHERING AND DISPOSAL MACHINE

Horace G. Gregory, Sioux Falls, S. Dak.

Application June 6, 1946, Serial No. 674,801

3 Claims. (Cl. 55—118)

This invention relates to leaf gathering and disposal machines and the like, more particularly provided and adapted for gathering and removing leaves, mown grass, twigs, sticks and other loose particles from lawns and other grass plots or surface areas, disintegrating and grinding the gathered material and then distributing the finely reduced product back upon the cleared surface as a fertilizing mulch.

One object is to produce a practical and efficient characteristic machine which is easily and effectively utilized, and power operated in both the leaf gathering provision and the disintegrating, grinding and product delivering and distributing provision.

Another object is to minimize weight of the machine without sacrificing strength and durability thereof, secure compactness in a self-contained, complete and well-balanced machine structure, and provide for ease and facility in the useful handling and manipulation of the machine.

A further object is to produce leaf gathering and disintegrating, grinding and product-delivering and distributing units in a working assembly to be applied as an operative attachment or combine on a conventional motor-powered lawn mower without material change in the latter except possibly removing certain mower parts thereof.

Other objects and advantages to be attained will hereinafter more fully appear in the following description.

A practical but non-limiting exemplification of the invention is illustrated in the accompanying drawings, in which:

Figure 1 is a perspective view of the complete machine;

Figure 4 is a detached sectional view illustrating details of the leaf gatherer element, taken on line 4—4 in Figure 2;

Figure 2:
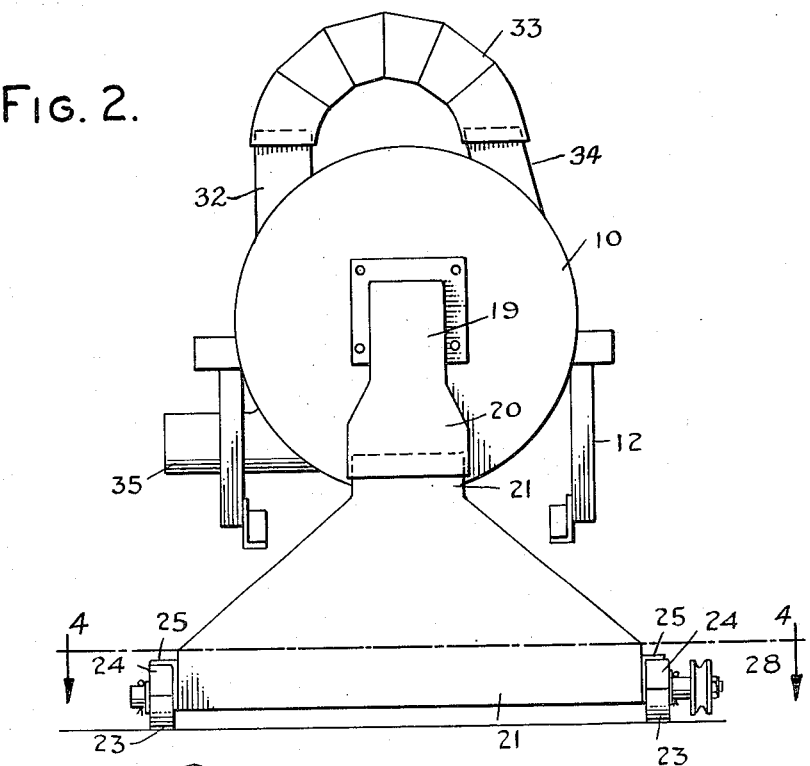
Figure 2 is an enlarged front elevation with parts omitted.

Referring now to the drawings in detail, the numeral 5 designates, generally the carriage body of the machine (see Figure 1) which is mounted on front and rear ground wheels 6, 7, respectively, there being a corresponding pair of such wheels on the opposite side of the machine (not shown).

The carriage of the machine may be of any suitable form, either specially designed and constructed or the essential parts of the present invention may be mounted on the regular carriage of a conventional motor-powered lawn mower. As shown, the carriage 5 includes a platform portion 8.

At the rear of the platform 8 is a conventional internal combustion engine 9. This type of motor is that generally used in this character of machine but it is to be understood that, as far as the present invention is concerned, the motor 9 may be electrical or any other suitable kind. However, the particular advantage in using an internal combustion engine is that the same does not require any extension cord or elongated flexible conducting element for supplying the energizing medium to the motor. The engine 9 is provided to furnish the driving power for the leaf gathering and the disintegrating, grinding and product-delivering and distributing elements of the machine.

Suitably supported rigidly and stably on the platform 8, ahead of the engine 9, is a suction and blower element housing 10 and a cooperatively associated disintegrator and grinder element housing 11, the two housings being arranged in longitudinal alinement and element 10 foremost. The housings 10 and 11, as shown, are welded, as at 43, upon and supported by a pair of upstanding frame type standards 12, 13, the standard 12 being foremost and located between the two housings 10 and 11 and the standard 13 to the rear of the housing 11. The two standards 12, 13 are rigidly secured at their lower end portions to the carriage platform 8 in any suitable and obvious manner (not shown). Each of the standards 12 and 13 is constituted as a pair of spaced vertical legs interconnected by a horizontal cross bar extending transversely of the machine.

Figure 3:
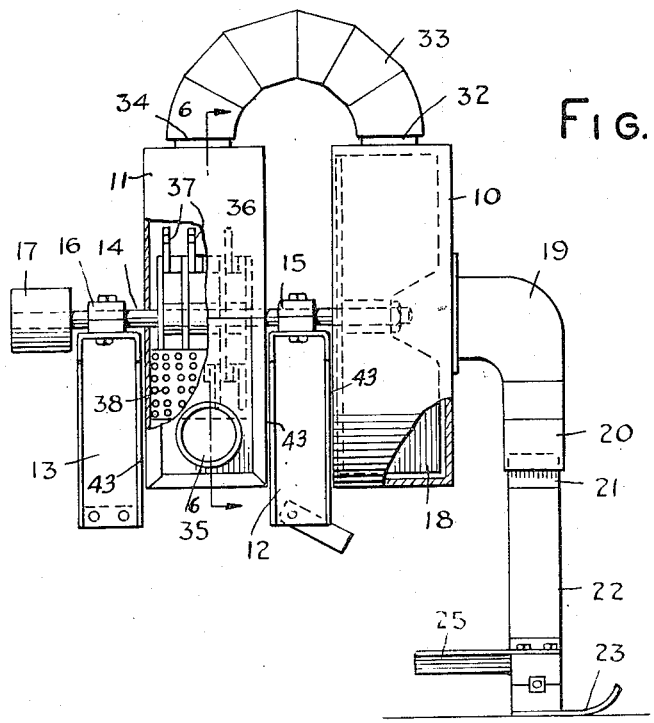
Figure 3 is a side elevation of the disclosure of Fig. 2 with portions broken away to disclose certain interior structural parts.
Figure 6:
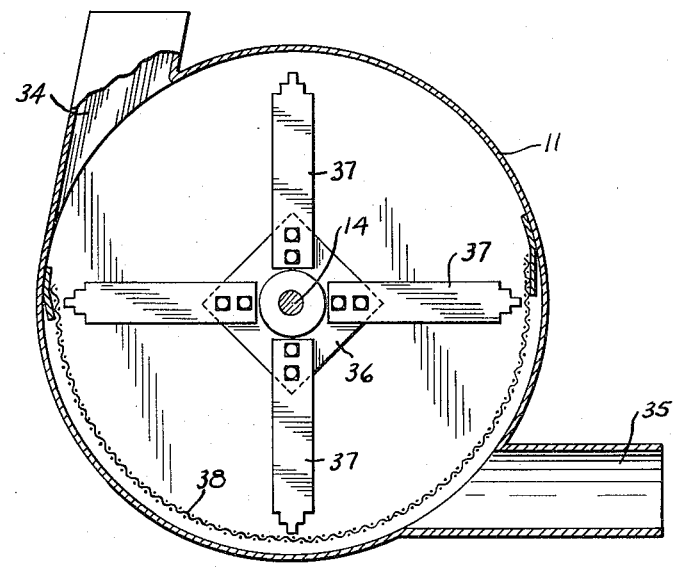
Fig. 6 is an enlarged sectional view, taken on line 6—6 in Fig. 3, detailing features of a disintegrator and grinder of the machine.
Figure 5:
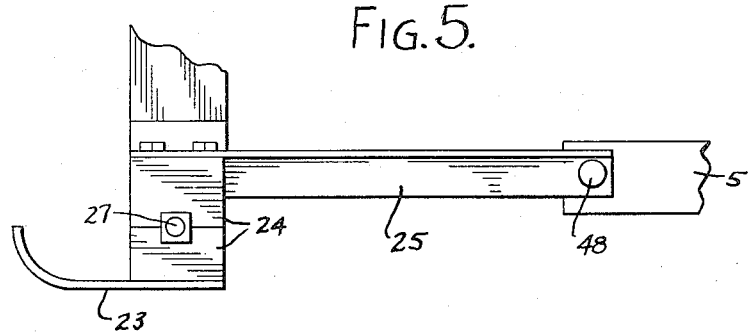
Fig. 5 is an enlarged fragmentary elevational view detailing the manner in which swingable beams or supporting arms of the machine are mounted upon a carriage body thereof.

A horizontal common rotatable power shaft 14 for the suction and blower element 10 and the disintegrator and grinder element 11 is supportedly journalled in bearings 15, 16, located respectively on the cross bars of the standards 12, 13 (see Figure 3). This shaft 14 is provided on its rear end portion with a pulley 17, which latter is driven by the engine 9 in any conventional manner.

Fixed on the forward portion of the power shaft 14, which is extended axially into the suction and blower element housing 10, is a fan element 18 of conventional kind. This fan element, when rotated at ample speed, draws in a draft of air through a central intake opening at the front of the housing 10 communicating with an angular pipe extension 19 of the housing. The intake opening and the pipe extension 19 may be of any desired cross-sectional form. As shown, the pipe extension is of rectangular cross section. Its down-turned lower end portion 20 is somewhat flared or widened.

Fitted vertically slidable in the flared lower end portion 20 of the air intake pipe extension 19 is the correspondingly rectangularly cross-sectioned shank portion 21 of a transversely flared and widened leaf gatherer nozzle 22 which is open throughout the extent of its bottom and which open bottom is positioned to travel close to the ground surface as the machine is propelled over the ground in its use.

The nozzle 22 is mounted on suitable runners provided and arranged to ride supportingly on the ground and being relatively set to maintain the lower open end of the nozzle at a definite limited distance above the ground surface.

For a practical exemplification runner shoes or skids 23 are shown as provided at opposite ends of the transverse elongated lower portion of the nozzle 22. These runner shoes or skids 23 are secured on the undersides of bearing block elements 24, which latter are mounted on the forward end portions of vertically swingable beams or supporting arms 25 which are hingedly attached, at their rear end portions respectively, as at 48, to opposite sides of the carriage body 5. In this way, the nozzle element 22 is permitted a compensatory up and down movement in conformity to unevenness and irregularity in the ground surface so as to avoid injury to the nozzle element. So, too, the slidably interfitted connection of the upper shank 21 of the nozzle element 22 in the lower portion 20 of the intake pipe 19 to the suction and blower element 10 cooperates in guiding the nozzle element in its up and down movements and in avoidance of damage to said element and its means of attachment to the suction and blower element.

Located within the lower portion of the leaf-collecting nozzle element 22 is a rotary rake element, designated generally by the numeral 26. This particular element comprises an elongated rotary shaft 27 which has its opposite end portions extended through and supportedly journalled in said bearing blocks 24. One end of this shaft 27 is provided with a peripherally grooved pulley 28 to receive a driving belt 29 which is in turn looped about a power pulley 30 fixed upon a forward ground wheel 6.

Preferably, the belt 29 is crossed between the pulleys 28 and 30, so that, as the machine is propelled forwardly in the use thereof, the pulley 28 is caused to rotate reversely to the rotation of the ground wheel pulley 30. In this way, instead of the rotary rake element 26 directing the disturbed leaves on ground back rearwardly toward the ground surface just traversed by the machine, the leaves are gathered and moved forwardly on the ground ahead of the machine in its direction of travel, thus keeping the traversed ground surface clear of the previously covering leaves, as the leaves that are gathered are readily drawn into the gatherer nozzle element 22 by the suction created therein by the action of the fan 18 in the suction and blower element 10.

The rotary rake element 26 may be of any suitable construction, but, as shown, the shaft member 27 is provided with a multiplicity of radial pins or fingers 31, spaced longitudinally apart and in staggered relation annularly of the shaft. If the rake element is rotated as just previously described, the leaves are effectively gathered and directed into the gatherer nozzle 22 and the proper speed of rotation is easily determined. The rotation of the rake element is brought about in a practical and efficient manner by the aforesaid pulley and belt provision but the same may be obviously accomplished by other power means (not shown) and either directly or indirectly from the engine 9 instead of from the ground wheel 6 of the machine carriage. As will be apparent from Fig. 4 of the drawings, the radial pins or fingers 31 are disposed in relation to each other to provide what is, in effect, a double auger operative to feed the material inwardly from both sides of the machine. That is to say, the pins or fingers 31 at each side of a pin or finger disposed at the midlength of the elongated rotary shaft 27 have relation to each other to produce spiral movement when the rake element 26 is rotated directing the material being picked up toward the center of the machine into vertically alined relation with the intake pipe 19.

The suction and blower element 10 is provided with a peripheral outlet opening having a communicating nipple extension 32 which is connected by an arched conductor pipe 33 to a corresponding nipple extension 34 in communication with a peripheral intake opening in the housing 11 of the disintegrator and grinder element. Through the conductor pipe 33 the leaves sucked with the intaken air stream into the housing 10 are blown from said housing with the air blast created by the fan 18 and into the upper portion of the companion housing 11, where the leaves are disintegrated and ground by the operating elements in said housing 11, and, finally, the minutely reduced particled product, resulting from the disintegration and grinding of the leaves, is discharged from the lower portion of the housing, through a peripheral spout extension 35 and laterally of the machine in a spray, and the same is thus distributed quite evenly upon the immediate area at the side of the travelling machine. The so discharged and distributed reduced material serves as a valuable fertilizing mulch for lawns and other grass plots while at the same time the machine is efficient in the collection and removal of accumulated quantities of leaves, mown grass and other foreign and undesirable loose particles from lawns and the like. A machine constructed and provided in accordance with the present invention is also effective in the chewing up of twigs and small sticks of wood lying about on the lawn and it is also effective in the disintegration of stones taken in with the primary intended collection of leaves and mown grass.

The disintegrator and grinder provisions in the element 11 may be of any suitable and approved kind or type. As shown, the mechanism is of the hammer type, that is, the portion of the shaft 14 extending axially through the housing 11, has fixed thereon a rotor 36 carrying a plurality of peripheral hammer members 37 in a generally conventional arrangement and working relation to a screen 38 as ordinarily provided in devices of this kind.

In the illustrated machine, the carriage 5 is in exemplification of one of an ordinary power driven lawn mower, and as such, it is provided with the usual handling frame 39 having the regular hand grips 40. However, in view of the possible excess weight of the working units of the present invention as applied to the machine carriage, even if certain of the lawn mower proper parts are removed, supplemental brace members 41 (see Figure 1) may be added to the assembly, said members 41 being attached in any suitable manner at their inner ends to adjacent parts of the structure, for example, to one or both of the standard frames 12, 13, and, adjacent their outer ends, to the crossed portions of the handling frame side members near the hand grips 40 thereof, the extreme outer end portions 42 of the brace members 41 being extended a substantial distance beyond the hand grip portions 40 so as to be conveniently grasped by the hands of the operator of the machine if so desired or deemed necessary.

The machine of the present invention has many advantages and its operation is quite apparent from the ilustration in the drawing together with the foregoing detailed description. Obviously, the one suction and blower element not only draws in the gathered leaves, mown grass, twigs and sticks, but the blast from the same forces the collected material through the disintegrator and grinder element and the reduced product out of the machine.

While the illustrated construction and arrangement is a practical exemplification, the same is not necessarily a limitation of the invention, as modification and change is contemplated within the purview of the invention as defined in the appended claims. The invention, therefore, is not limited to the specific construction and arrangement shown.

What is claimed is:

1. In a machine of the character described, a carriage, a motor thereon, a disintegrator upon said carriage, a suction and blower unit on said carriage in longitudinal alinement with said disintegrator, the disintegrator having a grinder rotor therein and the suction and blower unit having a rotary suction and blower fan therein, a rotatably mounted power shaft to be driven by said motor fixedly supporting said grinder rotor and said fan, a gatherer extension at a side of said suction and blower unit opposite said disintegrator having an intake opening at its lower portion and an outlet opening contiguous with said fan, a power rotated pick-up element in said gatherer extension adjacent its intake opening, means for actuating said pick-up element, a conductor pipe at a side of and connected between said disintegrator and suction and blower unit, said conductor pipe including an intake opening contiguous with said fan and an outlet opening contiguous with said grinder rotor, and an outlet from said disintegrator in spaced relation to said conductor pipe and contiguous with said grinder rotor, said fan of said suction and blower unit being adapted to be operative to create intake air draft and air transfer and discharge blast in the machine capable of causing material gathered by said pick-up element to be drawn into said gatherer extension, passed through said suction unit, conducted into and through said disintegrator and the product of disintegration to be discharged from the machine by way of said outlet from said disintegrator.

2. The combination as specified in claim 1 wherein said pick-up element is constituted as a rake having radial fingers disposed in relation to each other to provide what is, in effect, a double auger operative to feed the material inwardly from both sides of said machine toward a midportion of said gatherer extension.

3. In a machine of the character described, a carriage, a motor thereon, a suction and blower unit on said carriage, a rotary suction and blower fan in and an outlet from said suction and blower unit, a rotatably mounted power shaft to be driven by said motor fixedly supporting said fan, a gatherer extension at a side of said suction and blower unit having an intake opening at its lower portion and an outlet opening contiguous with said fan, a power rotated pick-up element in said gatherer extension adjacent its intake opening constituted as a rake having radial fingers disposed in relation to each other to provide what is, in effect a double auger operative to feed material to be gathered by said pick-up element inwardly from both sides of said machine toward a midportion of said gatherer extension, and means for actuating said pick-up element, said fan being adapted to be operative to create intake air draft and air transfer and discharge blast in the machine capable of causing material gathered by said pick-up element and fed inwardly of the machine to be drawn into said gatherer extension, passed through and discharged from said suction and blower unit.

HORACE G. GREGORY.

REFERENCES CITED

The following references are of record in the file of this patent:

UNITED STATES PATENTS

| Number | Name | Date |
| --- | --- | --- |
| 998,544 | Mosher | July 18, 1911 |
| 1,229,870 | Blakeslee | June 12, 1917 |
| 1,331,710 | Isom | Feb. 24, 1920 |
| 2,105,803 | Barnes | Jan. 18, 1938 |
| 2,242,922 | Poynter | May 20, 1941 |
| 2,256,219 | Ronning | Sept. 16, 1941 |